United States Patent [19]

Joubert et al.

[11] Patent Number: 4,820,217

[45] Date of Patent: Apr. 11, 1989

[54] DEVICE FOR PREVENTING A FLEXIBLE LINE FROM TWISTING

[75] Inventors: Philippe Joubert, Jouy En Josas; Jean Falcimaigne, Bois Colombes, both of France

[73] Assignee: Institut Francais du Petrole, Rueil-Malmaison, France

[21] Appl. No.: 947,754

[22] Filed: Dec. 30, 1986

[30] Foreign Application Priority Data

Dec. 30, 1985 [FR] France ................... 85 19428

[51] Int. Cl.⁴ .............................................. B63B 21/00
[52] U.S. Cl. ...................................... 441/5; 114/114 B; 114/293
[58] Field of Search ..................... 441/1, 3–5; 114/114 B, 230, 293; 166/352, 359, 367

[56] References Cited

U.S. PATENT DOCUMENTS

| | | | |
|---|---|---|---|
| 3,191,201 | 6/1965 | Richardson et al. | 114/144 B |
| 3,191,570 | 6/1965 | Henderson | 114/144 B |
| 4,301,760 | 11/1981 | Cassone et al. | 114/144 B |
| 4,351,027 | 9/1982 | Gay et al. | 114/144 B |
| 4,648,848 | 3/1987 | Busch | 441/5 |

Primary Examiner—Sherman D. Basinger
Assistant Examiner—Stephen P. Avila
Attorney, Agent, or Firm—Antonelli, Terry & Wands

[57] ABSTRACT

A device is provided for avoiding twisting of a flexible line having two ends one of which is connected to a revolving joint having two parts, one of these two parts being integral with said end and the outer part of said revolving joint being integral with floating installation movable with respect to the other end of said flexible line. The device of the invention further includes means for setting one of the parts of said revolving joint in rotation with respect to the other.

8 Claims, 3 Drawing Sheets

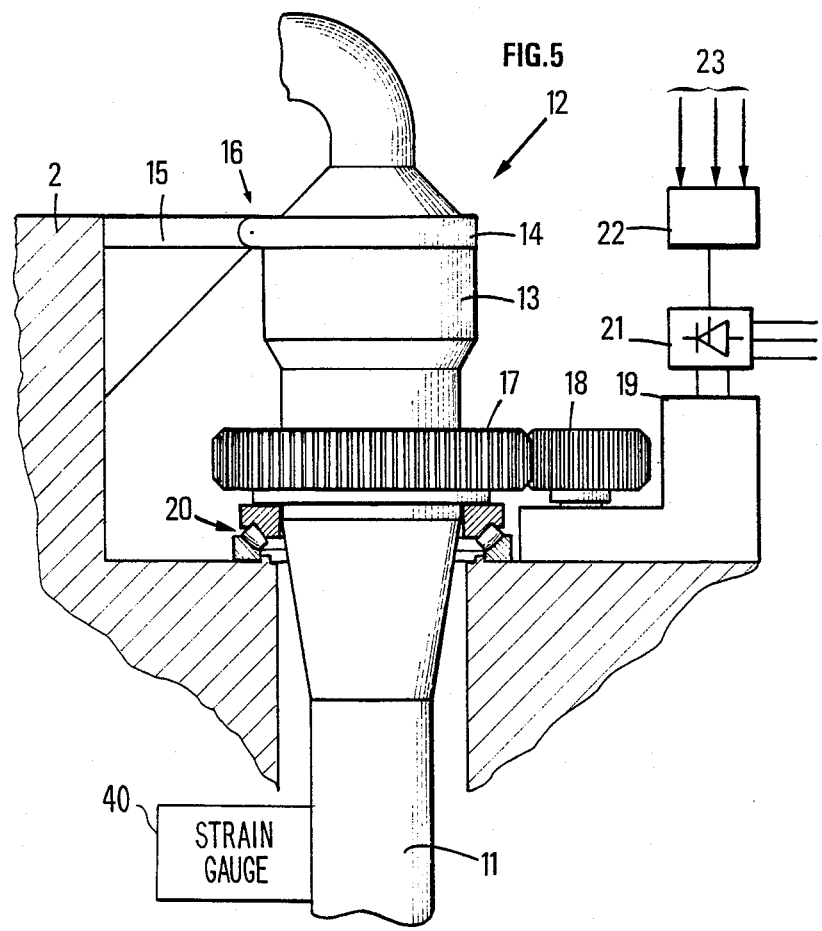
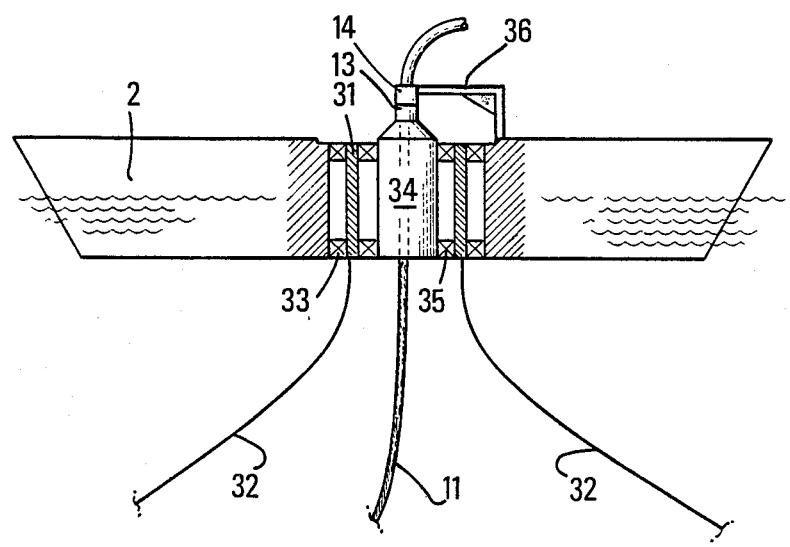

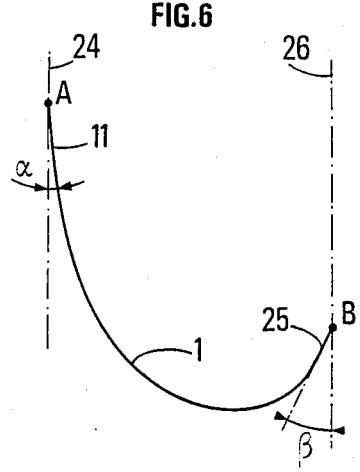
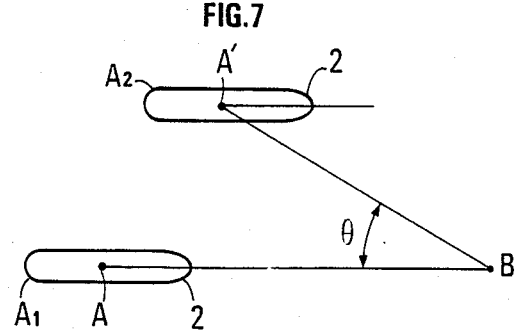
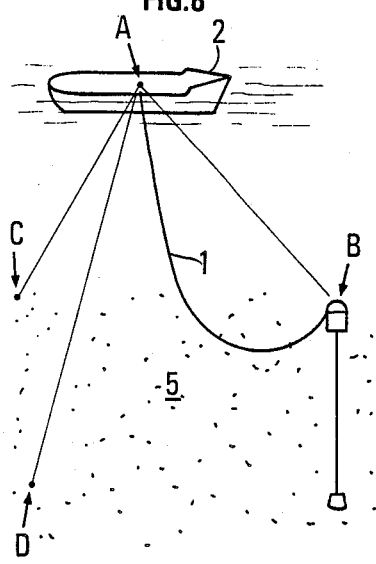
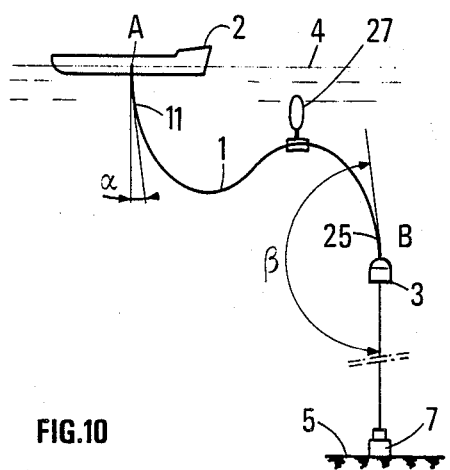
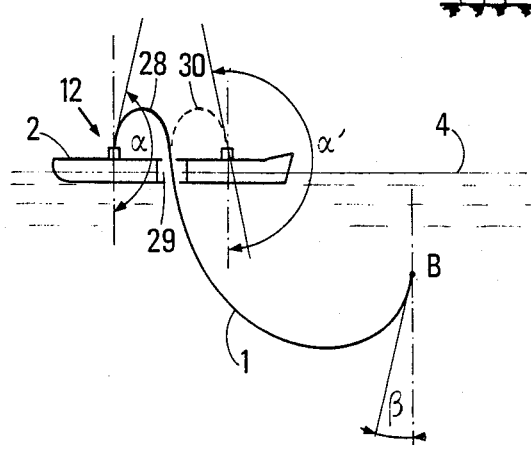

DEVICE FOR PREVENTING A FLEXIBLE LINE FROM TWISTING

BACKGROUND OF THE INVENTION

The present invention relates to a device for preventing a flexible line more particularly, a flexible pipe, from twisting.

The present invention is especially applicable to the offshore production of oil products.

The bottom/surface connections of floating production systems use flexible pipes which are disposed in the form of a catenary, this configuration accommodating the horizontal and vertical movements of the floating support. When this support is an oil ship or semisubmersible platform, a swivel or revolving joint allows to rotate about the head of the flexible pipe.

If the revolving joint is perfect (without friction) and if the oil ship remains in the vertical plane of the flexible pipe, no twisting is induced in the flexible pipe.

On the other hand, if the revolving joint is not perfect, which is practically always the case (in particular in the case of high pressure revolving joints and in the case of movements outside the above mentioned plane), a twist appears in the flexible pipe even if the oil ship keeps a constant heading.

Such twists are prejudicial to the longevity of the line, particularly because of the wear which they generate by friction of the sheathing layers on each other. In addition, these twists cause reactions which may be harmful for the fixing points at the ends of the flexible line and more generally for the supports of these fixing points.

The device of the present invention avoids the twisting of the flexible pipe, which reduces the stresses in the sheathing layers generally forming the flexible pipes and reduces warping of the flexible pipe and consequently the flexions.

SUMMARY OF THE INVENTION

Thus the present invention provides a device avoiding the twisting of a flexible line having two ends one of which is connected to a revolving joint having two parts, one of these two parts being integral with said one end, the other part of the revolving joint being integral with an installation which is movable with respect to the other end of said flexible line. The device of the invention includes means for rotating the first part of the revolving joint relatively to the second part of this same revolving joint.

Means for setting the one part in rotation could include a motor dependent on an automatic control system taking into account the geometrical characteristics of the flexible line.

The device of the present invention may include means for determining the variation of the relative position of the two ends of the flexible line.

The means for determining the relative position variation may include at least two inclinometers, a directional sounder and at least one compass.

The means for determining the relative position variation may include at least three beacons, possibly of the acoustic type.

In another variant, the device of the present invention may include means adapted for measuring the twist of said flexible line.

These means may include strain gauges and/or accelerometers placed on the flexible line.

Still within the scope of the present invention the ends of said flexible line may form substantially equal angles with respect to the vertical direction in the vicinity of their connection point, the directions of these ends considered, in a vertical direction, being opposed from the connection point and being directed towards the other end.

The means for determining the variation of the relative position of said two ends may be adapted for measuring the angles: Theta : formed by the orthogonal projection on a horizontal plane (A, B', A') of the connection point (A, A') of the end (11) of the flexible line to said installation before and after the movement of said floating installation and of the connection point (B) between the immersed installation and the other end of the flexible line, the apex of said angle being formed by the projection (B') of this latter point, Alpha: formed by the end (11) of the flexible line integral with said installation and the vertical direction,
Beta: formed by the other end (25) of the flexible line,
h: angle of variation of the heading of the ship. The means providing rotation may be adapted for rotating said parts of the revolving joint with respect to each other through an angle Gamma defined by the following relationship:

Gamma=Theta (1+cos(Beta))/cos(Alpha)))+h where cos designates the cosine function.

BRIEF DESCRIPTION OF THE DRAWINGS

The present invention will be better understood and its advantages will appear more clearly from the following description of particular examples, in no wise limitative, illustrated by the accompanying Figures in which:

FIG. 5 shows one embodiment of the device of the present invention, FIGS. 6 and 7 define geometric angles for characterizing the positioning of the flexible line, FIG. 8 shows one method of determining the variation of position of the surface installation, FIGS. 9 and 10 illustrate particular configurations of the flexible line, and FIG. 11 shows the application of the present invention to the case where a mooring tower is used for mooring the surface installation.

DESCRIPTION OF THE PREFERRED EMBODIMENTS

Figure 1:
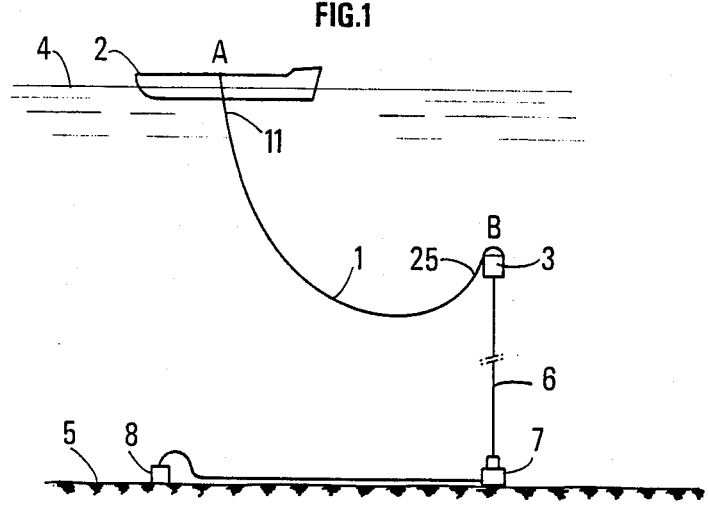
FIG. 1 shows a flexible line joining an immersed installation to a surface installation.

Reference 1 in FIG. 1 designates a flexible line connecting a floating installation 2 such as a ship to an immersed installation 3. Reference A schematizes the point of connection between ship 2 and one end 11 of the flexible line 1. The reference B schematizes the connection point between the immersed installation such as buoy 3 and another end 25 of the flexible line 1.

By flexible line is meant any pipe line possible comprising one or more ducts serving for example for transferring a petroleum effluent, one or more electric cables, or optical fibers etc.

In FIG. 1, as well as in the other Figures, the reference 4 designates the surface of a body of water and reference 5 the bottom of the body of water.

The immersed installation 3 in FIG. 1 may be a buoy connected to a riser 6 anchored by a base 7 to the bottom 5. This riser 6 may serve for conveying the production of one or more immersed oil wells 8.

Figure 2:
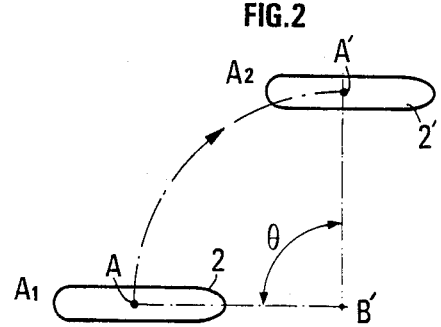
FIG. 2 illustrates a movement of the surface installation without there being for all that a change of heading of this installation.

As was mentioned in the introductory part of the present description some movements of ship 2 may induce torsional stresses in the flexible line 1, for example if the ship passes from position A1 to position A2 shown in FIG. 2, such that the angle Theta formed by:

the point A of the connection between the end of the flexible pipe and ship 2 considered in the position A1, the point B' which is the projection, on a horizontal plane containing the ship of the connection point B between the other end of the flexible line 1 and the immersed installation, and the connection point A' between the end of the flexible pipe and ship 2 considered in the position A2, is equal to a given angle, for example 90°, the twist in the flexible line may reach the double of this angle namely 180°; whereas the ship does not change heading.

Figure 3:
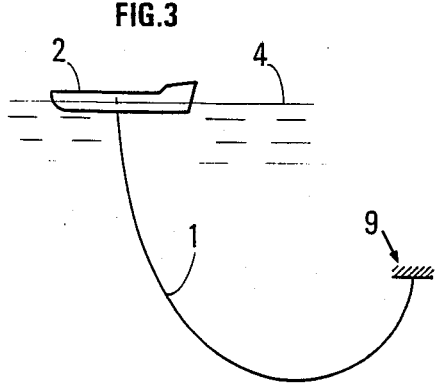
FIGS. 3 and 4 illustrate two different methods of fixing the flexible line to the immersed installation.
Figure 4:
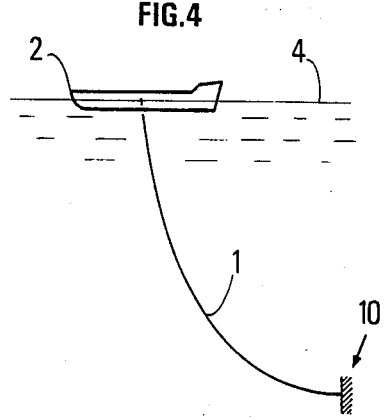

The twist angle of the flexible line of a value of 180° for an angle Theta of 90° corresponds to the case where the flexible line is embedded in the fixed installation so that its end is substantially vertical and so that the flexible line has the same form of convexity. This is shown in FIG. 3. The reference 9 in FIG. 3 shows schematically an embedment. The case of FIG. 4 represents an embedment 10 of the end of the flexible line connected to the immersed installation, such that this end belongs to a horizontal plane. Such an embedment would induce a twist in the flexible line of 90° for an angle Theta of 90°. Of course, these twist angles of 180° and 90° assume that the end of the flexible line connected to the ship is held against rotation.

The present invention avoids twisting of the flexible line, which reduces the stresses in the sheathing layers and reduces the warping of the lines generally used in the field of offshore production of oil products.

FIG. 5 shows one embodiment of the present invention.

The end 11 of the flexible line 1 is connected to the floating installation 2 by means of a revolving joint 12 having two parts 13 and 14, these two parts being able to rotate with respect to each other.

In FIG. 5, the reference 13 designates the part of the revolving joint secured for rotation with the end 11 of the flexible line and reference 14 the part of the revolving joint fixed for rotation with the floating installation 2. This may be provided by a connecting arm 15 which may be welded to the floating installation 2 and fixed to part 14 of the revolving joint by a flange 16.

Part 13 of the revolving joint integral with the flexible line may be rotated by means of a gear wheel 17. This gear wheel cooperates with a toothed pinion 18 which may be driven in rotation by a motor 19. This motor may be electric, hydraulic etc.

Part 13 of the revolving joint may rest on bearings 20 which allow the rotational movement of this part 12 of the revolving joint relatively to the floating installation 2.

As heretofore mentioned, the motor 19 driving pinion 18 may be electric and its power supply may be provided by an electronic power system 21 which may itself be controlled by a regulation device 22, possibly electronic.

The electronic regulation system may include a processor such as those generally used for carrying out regulation tasks, particularly those used in ships with dynamic positioning.

The regulation system 22 receives the information symbolized by arrows 23 (FIG. 5), for knowing or deducing the stress condition to which the flexible line 1 is subjected.

The regulation system 22 acts on the power supply system 21, so as to supply motor 19 with power so that it drives pinion 18 and gear wheel 17, in order to cause rotation of end 11 of the flexible line, such rotation being of a sufficient angular amplitude and in a suitable direction for reducing the twist in the flexible line.

One example of determining the amplitude of rotation to be given to the part of the revolving joint integral with end 11 of the flexible line is given hereafter.

The torsion angle variation T in the flexible line embedded at both ends is given by the formula:

$$T = \text{Theta} [\cos(\text{Alpha}) + \cos(\text{Beta})] - \text{Gamma} [\cos(\text{Alpha})]$$

where:

cos: designates the cosine function

Theta: the angle formed in a horizontal plane by the connection points of the end 11 of the flexible line, A and A', considered before and after movement of the ship (see FIG. 7) and by the point B' of projection on the horizontal plane of the connection point B between the immersed installation and the other end of the flexible line, Gamma: the angle formed by the two parts of the revolving joint which is assumed zero at the starting position A1 if the twist is also zero for this starting position, Alpha: the angle formed by the end 11 of the flexible line with a vertical half axis 24 passing through the connection point A between : this end 11 and the floating installation, not shown in FIG. 6, Beta: the angle formed by the other end 25 of the flexible line 1 with a vertical half axis of the same orientation as that used for defining the angle Alpha passing through the connection point B between this end 25 and the immersed installation (not shown in Figure 6).

The different angles Alpha, Beta, Theta are represented in the Figures by Greek characters.

Thus, for a movement through an angle Theta indicated in FIG. 7, with a constant heading of the ship, the two parts of the revolving joint must be rotated through an angle Gamma so as to cancel out the torsional variation of the flexible line caused by this displacement.

Gamma is given by:

$$\text{Gamma} = \text{Theta} \, (1 + \cos(\text{Beta}))/(\cos(\text{Alpha})).$$

A variation of heading h of the ship during displacement of this latter will be compensated for by a complementary rotation of the two parts of the revolving joint. Generally Gamma is equal to:

$$\text{Gamma} = \text{Theta} \, (1 + (\cos(\text{Beta}))/(\cos(\text{Alpha}))) + h.$$

The function of the device for determining the Gamma rotation of the revolving joint consists in measuring the values of the angles Alpha, Beta, Theta and h, introducing them into a processor which determines the angle Gamma as a function of the general equation given above and commanding the motor to drive the revolving joint through an appropriate value of the angle Gamma.

This device may include inclinometers for measuring the angles Alpha and Beta, a directional sounder for measuring the angle Theta and a compass for measuring the angle h.

These measurements are well known to a man skilled in the art and will not be described in greater detail here.

An advantageous variant consists in disposing two beacons C and D (see FIG. 8) on the bottom of the water 5, so that the plane ACD is distinct from the vertical plane passing through AB and a third beacon at point B.

In this case, the measurement of the distances AB, AC and AD gives at all times the position of ship A with respect to point B.

The beacons placed at points B, C and D may be acoustic beacons.

In another embodiment of the present invention, the twist in the flexible line may be measured directly, for example by means of a strain gauge 40 bonded to the flexible line and the signals delivered by this strain gauge may be transmitted to the regulation system 22. Without departing from the spirit of the present invention, several embodiments may be used simultaneously so as to increase the reliability thereof.

FIG. 9 shows a configuration of the flexible line which does not require a relative rotation of the two parts of the revolving joint with respect to each other when the ship keeps a constant heading. In this configuration, the flexible line 1 has the shape of an S and the end 11 of this line fixed to the floating installation forms an angle with the vertical direction equal to that formed by the end 25 of the flexible line 1 fixed to the immersed installation at B with the vertical direction.

The ends 11 and 25 are oriented from their connection point, respectively A and B, in opposite orientations considered in the vertical axis, the angle Alpha and Beta such as defined previously being supplementary.

The S shape is obtained for example by means of a buoy 27 or floats spaced apart over a portion of the length of the flexible line.

FIG. 10 shows another S configuration in which one of the loops 28 of the S is formed on the floating installation 2 after the flexible line 1 has passed through a passage 29 formed in the ship. It is important for the flexible line to be able to be free in this passage 29 and not to be guided. In this Figure, another configuration has been shown with broken lines 30 in which the flexible line forms a second loop 30 substantially in the opposite direction of loop 28 of the S shaped portion of the flexible line and thus the configuration of the flexible line has a C shape.

Hawsepipes may be used on the floating installation for facilitating shaping of the loop 28 or 30.

FIG. 11 shows the application of the present invention to the case where a tower 31 is used for mooring the ship 2.

The tower 31 is anchored to the seabed by lines 32.

The ship may rotate about the tower 31 via bearing means 33.

Inside the tower 31 is provided a body 34 integrally secured to the end 11 of line 1, this body possibly supporting the part 13 of the revolving joint integral with end 11 of the flexible line 1.

Through bearing means 35, body 34 is mounted for free rotation in the tower 31 in FIG. 11.

As in FIG. 5, the reference 14 designates the part of the revolving joint fixed for rotation with ship 2, for example by means of an arm 36.

The part 13 of the revolving joint may be controlled in rotation by means similar to those described above with reference to FIG. 5.

Thus, the present invention applies to the case where a tower is used in the same way as if it were not present.

The embodiment illustrated in FIG. 11 may include means for separating body 34 from tower 31, particularly in the course of an emergency procedure for avoiding damage to the flexible line.

In this case, body 34 may include a buoy for maintaining the end 11 of the flexible line, possibly with the part 13 of the revolving joint, under water after disconnection.

What is claimed is:

1. A device for avoiding twisting of a flexible line having two ends, one end of which is connected to a revolving joint having two parts, one of these two parts being integral with said one end, the other part of said revolving joint being integral with a floating installation which is movable with respect to said other end of said flexible line, including means for setting one of the parts for said revolving joint in rotation relative to the other and means for determining the variation of the relative position of said two ends of said line, said means for determining the variation of the relative position of said two ends being adapted for measuring the angles Theta, Alpha, Beta and h wherein:

angle Theta is formed by the orthogonal projection on a horizontal plane of a point of connection of the one end of said flexible line to said floating installation before and after displacement of said floating installation and of a connection point between an immersed installation and the other end of said flexible line, an apex of said angle Theta being formed by a projection of said connection point between the immersed installation and the other end of the flexible line;

angle Alpha is formed by the end of the flexible line integral with said floating installation and a vertical half axis;

angle Beta is formed by the other end of said flexible line, with a vertical half axis of the same orientation as that used for defining the angle Alpha; and angle h is an angle of variation of the heading of the floating installation; said means for setting one of said parts in rotation being adapted for rotating said parts of the revolving joint with respect to each other through an angle Gamma wherein:

Gamma=Theta (1+cos(Beta))/(cos(Alpha)))+h where cos designates the cosine function.

2. The device as claimed in claim 1, wherein said means for setting in rotation include a motor dependent on an automatic control system.

3. The device as claimed in claim 1, wherein said means for determining the relative position variation include at least two inclinometers, at least one directional sounder and at least one compass.

4. The device as claimed in claim 1, wherein said means for determining the relative position variation include at least three beacons.

5. The device as claimed in one of claims 1 or 2, including means adapted for measuring the twist in said flexible line.

6. The device as claimed in claim 5, wherein said means adapted for measuring the twist in said flexible line include a strain gauge.

7. The device as claimed in claim 1, wherein said ends of said flexible line form substantially equal angles with respect to the vertical direction, in the vicinity of a connection point and orientations of said ends, in a vertical axis, being opposed starting from a connection point towards the other end.

8. Application of the device as claimed in claim 1, to the flexible line connection between two offshore installations.

* * * * *